(12) United States Patent
Edamura et al.

(10) Patent No.: US 7,194,821 B2
(45) Date of Patent: Mar. 27, 2007

(54) VACUUM PROCESSING APPARATUS AND VACUUM PROCESSING METHOD

(75) Inventors: Manabu Edamura, Ibaraki-ken (JP);
Akitaka Makino, Hikari (JP);
Motohiko Yoshigai, Hikari (JP);
Takanori Nakatsuka, Kudamatsu (JP);
Susumu Tauchi, Shunan (JP)

(73) Assignee: Hitachi High-Technologies Corporation, Tokyo (JP)

( * ) Notice: Subject to any disclaimer, the term of this patent is extended or adjusted under 35 U.S.C. 154(b) by 76 days.

(21) Appl. No.: 11/068,804

(22) Filed: Mar. 2, 2005

(65) Prior Publication Data
US 2006/0168844 A1 Aug. 3, 2006

(30) Foreign Application Priority Data
Jan. 28, 2005 (JP) ............................. 2005-022114

(51) Int. Cl.
*F26B 7/00* (2006.01)
(52) U.S. Cl. .............................. 34/381; 34/407; 34/78; 34/80; 118/724
(58) Field of Classification Search .................. 34/380, 34/381, 407, 78, 80, 281; 118/724, 725; 374/161
See application file for complete search history.

(56) References Cited

U.S. PATENT DOCUMENTS 4,673,456 A * 6/1987 Spencer et al. ........ 156/345.36
5,157,960 A * 10/1992 Brehm et al. .................. 73/38

FOREIGN PATENT DOCUMENTS

| JP | 58-215521 | * 12/1983 |
| JP | 2002-346367 | 12/2002 |

\* cited by examiner

*Primary Examiner*—S. Gravini
(74) *Attorney, Agent, or Firm*—Antonelli, Terry, Stout and Kraus, LLP.

(57) ABSTRACT

The downtime of a vacuum processing apparatus due to wet cleaning is reduced. In a vacuum processing apparatus that requires aging for its chamber or process container after vacuum evacuation of the apparatus and before actual processing of a workpiece, when the chamber has been opened to atmosphere for the purpose of wet cleaning or component replacement, the apparatus comprises a high precision absolute pressure gauge for use in processing, a wide range gauge capable of measuring a wide range of pressures, and a controller, wherein the controller uses a pressure trend during vacuum evacuation to determine whether the vacuum evacuation is satisfactory, and starts aging upon determining that the vacuum evacuation is satisfactory even if the actual pressure is not below a prescribed value. The controller determines relationship between an apparent flow rate (leak rate) measured by the absolute pressure gauge when the chamber is vacuum sealed, and a chamber pressure measured by the wide range gauge, and then measures only the pressure to determine whether a baseline leak rate is reached.

11 Claims, 10 Drawing Sheets

VACUUM PROCESSING APPARATUS AND VACUUM PROCESSING METHOD

The present application is based on and claims priority of Japanese patent application No. 2005-022114 filed on Jan. 28, 2005, the entire contents of which are hereby incorporated by reference.

BACKGROUND OF THE INVENTION

1. Field of the Invention

The invention relates to a vacuum processing apparatus and vacuum processing method for carrying out processing on a workpiece, such as plasma etching, plasma CVD, thermal CVD, or sputtering, after vacuum evacuation in manufacturing semiconductor devices, liquid crystal display substrates and the like.

2. Description of the Related Art

The performance of vacuum processing apparatus as represented by semiconductor manufacturing apparatus has become much more demanding with the trend toward higher integration of semiconductor devices and larger area of liquid crystal displays. In plasma etching apparatus, for example, some of the reaction products generated by plasma etching inevitably are deposited to the inside of the etching chamber. The deposits may flake off and fall on the workpiece, causing defects that lead to lower yield of the process. Even if the deposits do not flake off, increase of the deposited reaction products gradually varies the plasma and the reaction balance during processing, which will cause etching defects, while no problem would otherwise occur in the initial state with fewer deposits. In this context, on the production line for semiconductor devices, plasma of fluorine and/or oxygen is repetitively generated once in a certain number of wafers to carry out plasma cleaning inside the chamber for the purpose of removing the reaction products by reacting them with the fluorine or oxygen. However, even such plasma cleaning cannot completely remove the deposits. For this reason, after a certain number of wafers are processed, the vacuum chamber of the apparatus is returned to atmospheric pressure with inert gas such as nitrogen. The vacuum chamber is then opened, wiped with water or volatile chemicals, and subjected to replacement of internal parts. That is, the vacuum chamber of the apparatus is opened to the atmosphere and cleaned throughout the inside. This is referred to as wet cleaning or complete cleaning.

Plasma etching apparatus for producing semiconductor devices may spend tens of percent of the total operating time in the wet cleaning. This decreases time available to the apparatus for actual production. The downtime of the apparatus due to wet cleaning includes not only the time during which the apparatus is actually opened to the atmosphere and cleaned, but also the preceding and following time periods. In particular, wet cleaning must be typically followed by vacuum evacuation until both the chamber base pressure (pressure in the apparatus before process gas is introduced) and the apparent gas inflow rate measured when evacuation is stopped and the chamber is vacuum sealed (the sum of flow rate due to leaks from the atmosphere and flow rate of net outgas from the surface of the chamber itself and its internal components, the sum being hereinafter referred to as leak rate) fall below a prescribed value. This is in order to confirm and ensure that the percentage of other gases mixed in the process gas is below a prescribed value.

The leak rate is typically determined as follows. First, the gate valve is closed. The rise rate of pressure is measured using a diaphragm gauge or the like capable of measuring absolute pressure. The leak rate LR is given by $LR = R \cdot V$ [PaL/s], where $R$ [Pa/s] is the measured pressure rise rate and $V$ [L] is the volume of the vacuum chamber. The leak rate is the sum of net (that is, representing the difference between desorption and adsorption) outgas flow rate from the surface of the chamber itself and its internal components, and leak flow rate from the atmosphere. Note that the pressure rise rate $R$ without being multiplied by volume $V$ may be used instead of the leak rate. It is understood, however, that they can be used interchangeably because the volume of the vacuum chamber of the apparatus is always constant.

The plasma etching apparatus further requires the so-called "aging" process when the degree of vacuum has reached a prescribed value. In the aging process, the temperature of the discharging unit is increased by break-in discharge with inert gas, and the inner surface of the process container is conditioned by discharge with actual process gas. If this is not sufficient for stable etching, many dummy wafers may be consecutively processed under the condition of actual product processing before the actual product processing is started. In this way, wet cleaning involves a very large amount of downtime of the apparatus. Reduction of the downtime can increase the amount of time available to the apparatus for actual production, which leads to increased production.

In particular, the time for evacuation usually accounts for a considerable percentage of the time for wet cleaning. It is widely known that evacuation from atmospheric pressure to high or ultrahigh vacuum is attributed to evacuation of water molecules adsorbed on the inner surface of the vacuum chamber and the like (see, for example, J. F. O'Hanlon, User's Guide to Vacuum Technology, John Wiley & Sons, Inc.). Even in the normal evacuation process, although depending on apparatus, it takes several to several tens of hours to reach a prescribed pressure and leak rate. Any leak from the atmosphere may occur due to, for example, small fibers caught in the O-ring or other seal which has prevented the apparatus pressure from decreasing to the prescribed pressure and leak rate. In that case, after a long time is spent in evacuation, the apparatus must be returned to the atmosphere to remove the fibers at the seal, and again evacuated. Such a trouble significantly wastes time.

To solve this problem, in the conventional art, there are a number of efforts for rapidly detecting evacuation abnormality. For example, Fukuzawa et al. has proposed a method of rapidly detecting evacuation abnormality and predicting time to reach the target pressure by comparing measured data of pressure with theoretical pressure change, and a vacuum apparatus having such a prediction control system (see, for example, Japanese Laid-Open Patent Application 2002-346367). It seems that their invention assumes evacuation of a chamber made of stainless steel. However, it is often the case that semiconductor manufacturing apparatus in recent years have a chamber made of aluminum alloy covered with anodized aluminum coating. Furthermore, various materials are used inside the chamber. As a result, it is difficult to determine a theoretical evacuation curve. It therefore seems that their method is difficult to apply to the apparatus having a chamber made of aluminum alloy covered with anodized aluminum coating. Moreover, they do not take into consideration the time for aging the apparatus after evacuation.

SUMMARY OF THE INVENTION

An object of the invention is to reduce the downtime of a vacuum processing apparatus due to wet cleaning. Plasma etching apparatus and the like require not only evacuation time itself but also break-in discharge and aging after a target degree of vacuum is reached. These additional time periods are not ignorable. The invention is directed to reducing the downtime of the apparatus including such additional time of aging and the like.

The foregoing object is achieved by the following approach. The target degree of vacuum is typically indicated by pressure and leak rate, both of which are required to fall below prescribed values. According to experiments conducted by the inventors, pressure is correlated with leak rate unless chamber surface condition does not change. In this respect, first, the relationship between pressure and leak rate is determined in advance. The pressure change can then be used to predict the time to reach a prescribed degree of vacuum (the tighter of pressure and leak rate). The start time and end time of aging can be determined so that break-in discharge and aging may be terminated at the predicted time. According to experiments conducted by the inventors, discharge does not significantly affect, or rather accelerates, evacuation of water molecules, although depending on the inner wall material of the vacuum chamber. Therefore, when aging is terminated, the target pressure and leak rate have been reached and product processing can be started immediately. According to the foregoing procedure, the downtime of the apparatus due to wet cleaning can be reduced by the amount of time originally needed for break-in discharge and aging.

More specifically, the invention provides a vacuum processing apparatus that requires aging for its chamber or process container after vacuum evacuation of the apparatus and before actual processing of a workpiece, when the chamber has been opened to atmosphere for the purpose of wet cleaning or component replacement, the apparatus comprising a high precision absolute pressure gauge for use in processing, a wide range gauge capable of measuring a wide range of pressures, and a controller, wherein the controller uses a pressure trend during vacuum evacuation to determine whether the vacuum evacuation is satisfactory, and starts aging upon determining that the vacuum evacuation is satisfactory even if the actual pressure is not below a prescribed value.

In an aspect of the vacuum processing apparatus according the invention, the controller determines relationship between a leak rate measured by the absolute pressure gauge and a chamber pressure measured by the wide range gauge, and then measures only the pressure to determine whether a baseline leak rate is reached.

The invention provides a vacuum processing apparatus that requires aging for its chamber or process container after vacuum evacuation of the apparatus and before actual processing of a workpiece, when the chamber has been opened to atmosphere for the purpose of wet cleaning or component replacement, the apparatus comprising a high precision absolute pressure gauge for use in processing, a wide range gauge capable of measuring a wide range of pressures, and a controller, wherein the controller uses a pressure trend during vacuum evacuation to determine whether the vacuum evacuation is satisfactory, predicts time to reach a prescribed degree of vacuum, and starts aging so that the aging is terminated near the predicted time.

In an aspect of the vacuum processing apparatus according the invention, the controller determines relationship between a leak rate measured by the absolute pressure gauge and a chamber pressure measured by the wide range gauge, and uses the pressure trend during evacuation to predict the time to reach a baseline leak rate. In another aspect of the vacuum processing apparatus according the invention, the chamber, or part or all of chamber internal components has a surface of anodized aluminum coating.

The invention provides a vacuum processing method for a vacuum processing apparatus that requires aging for its chamber or process container after vacuum evacuation of the apparatus and before actual processing of a workpiece, when the chamber has been opened to atmosphere for the purpose of wet cleaning or component replacement, the apparatus comprising a high precision absolute pressure gauge for use in processing and a wide range gauge capable of measuring a wide range of pressures, the method comprising using a pressure trend during vacuum evacuation to determine whether the vacuum evacuation is satisfactory, and starting aging upon determining that the vacuum evacuation is satisfactory even if the actual pressure is not below a prescribed value. The vacuum processing method according to the invention may comprise determining relationship between a leak rate measured by the absolute pressure gauge and a chamber pressure measured by the wide range gauge, and then measuring only the pressure to determine whether a baseline leak rate is reached.

The invention provides a vacuum processing method for a vacuum processing apparatus that requires aging for its chamber or process container after vacuum evacuation of the apparatus and before actual processing of a workpiece, when the chamber has been opened to atmosphere for the purpose of wet cleaning or component replacement, the apparatus comprising a high precision absolute pressure gauge for use in processing and a wide range gauge capable of measuring a wide range of pressures, the method comprising using a pressure trend during vacuum evacuation to determine whether the vacuum evacuation is satisfactory, predicting time to reach a prescribed degree of vacuum, and starting aging so that the aging is terminated near the predicted time. The vacuum processing method according the invention may comprise determining relationship between a leak rate measured by the absolute pressure gauge and a chamber pressure measured by the wide range gauge, and using the pressure trend during evacuation to predict the time to reach a baseline leak rate.

According to the invention, the pressure change of the process chamber is used to predict the time to reach a prescribed degree of vacuum (the tighter of pressure and leak rate). The start time and end time of aging are determined so that break-in discharge and aging may be finished at the predicted time. In this way, product processing can be started immediately, and the downtime of the apparatus due to wet cleaning can be reduced by the amount of time originally needed for break-in discharge and aging.

DETAILED DESCRIPTION OF THE PREFERRED EMBODIMENTS

The invention is not limited to the field of manufacturing semiconductor devices, but is applicable to vacuum processing apparatus used for processing products in a variety of fields such as manufacturing liquid crystal displays and various types of surface treatment. However, an embodiment will be described herein with reference to an example of plasma etching apparatus for manufacturing semiconductor devices.

Figure 1:
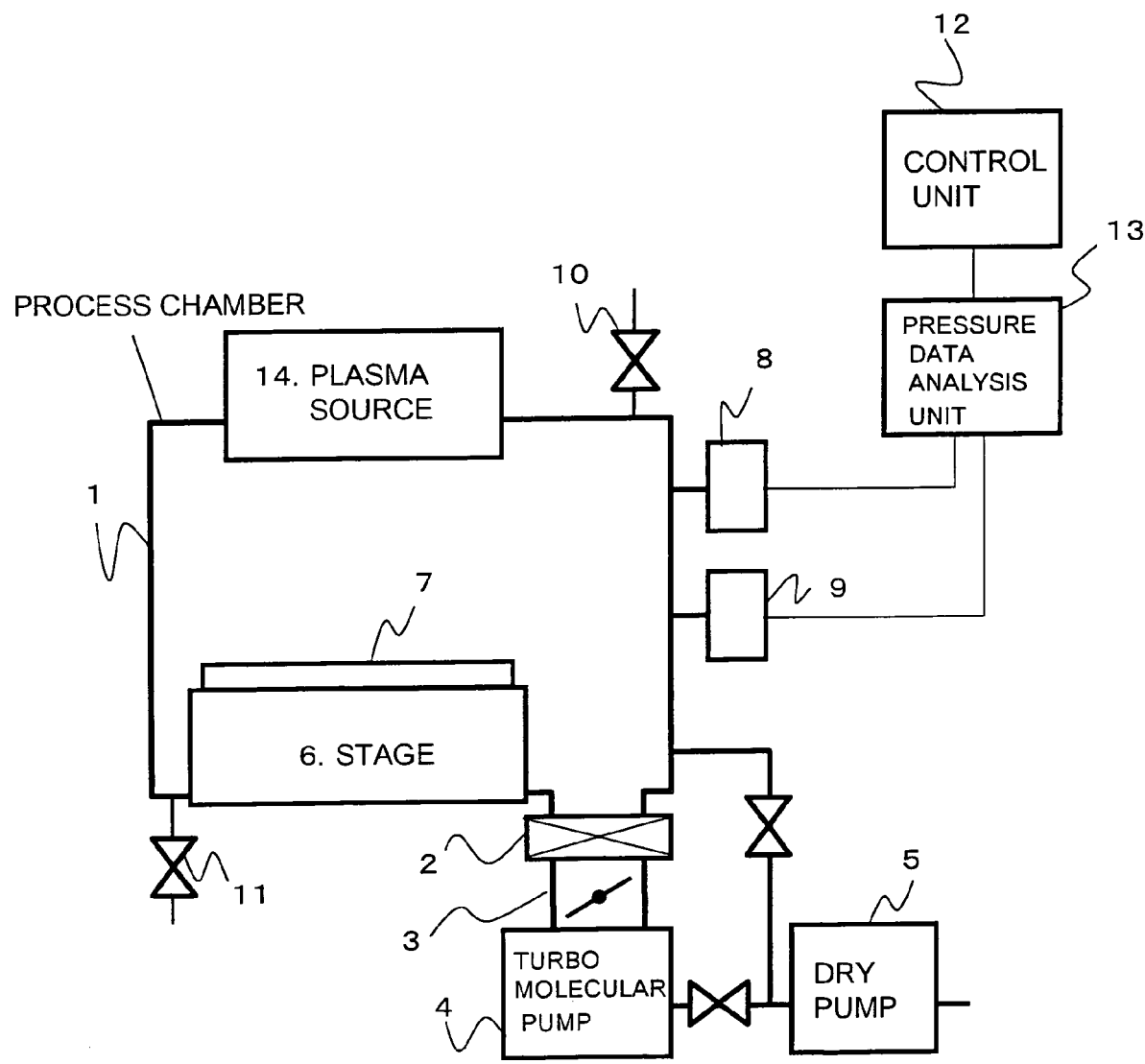
FIG. 1 is a cross-sectional view showing an embodiment of the invention.

FIG. 1 schematically shows a plasma etching apparatus as an embodiment of the invention. In FIG. 1, process chamber 1 is a vacuum container. Through a gate valve 2 and a butterfly valve 3 for adjusting pressure during processing, a turbo molecular pump 4 is connected to the process chamber 1. During processing, process gas is introduced from process gas inlet 10, plasma is generated by plasma source 14, and a wafer 7 on stage 6 is subjected to plasma etching.

A plasma etching apparatus is typically equipped with at least two types of vacuum gauges. One is absolute pressure gauge 8 such as diaphragm gauge for monitoring pressure during processing, and the other is wide range gauge 9 for measuring pressure of the apparatus in a wide range of pressures from atmospheric pressure to high vacuum. A commonly used gauge of the latter type is a combination of a Bayard-Alpert gauge or cold cathode gauge and a Pirani gauge. The diaphragm gauge can measure the absolute pressure with high accuracy, but can only make measurements near the processing pressure (a typical full scale for plasma etching apparatus is 13.3 Pa to 133 Pa). On the other hand, the wide range gauge can measure a wide range of pressures from atmospheric pressure to ultrahigh vacuum, but it has poor precision and large individual difference.

The plasma etching apparatus according to the invention comprises analysis means 13 for using data from these two pressure gauges to predict the time to reach a prescribed degree of vacuum (pressure and leak rate), as well as control means 12 for controlling the apparatus.

In measuring pressure during the evacuation process after wet cleaning, the wide range gauge 9 is used because a large change of pressure is involved. In measuring pressure increase upon closing the gate valve 2 in order to determine the leak rate, the absolute pressure gauge 8 having more accuracy is used. The leak rate is measured in order to confirm that the leak flow rate from the atmosphere and the outgas flow rate from the chamber surface are each within a prescribed range.

Figure 2:
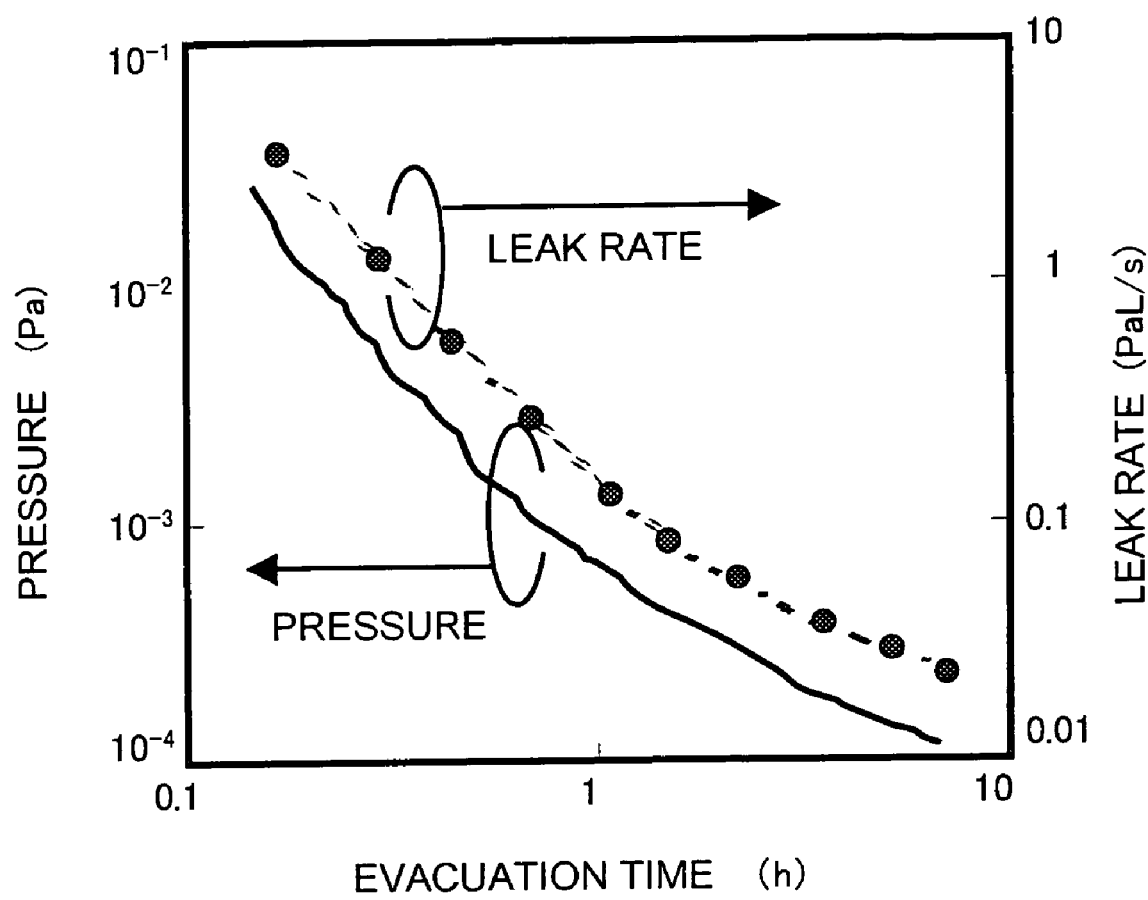
FIG. 2 shows a trend of pressure and leak rate during evacuation.

FIG. 2 shows time variations of pressure and leak rate during evacuation. As clearly seen in FIG. 2, these two parameters decrease almost the same way. Leak rate measurement requires interruption of evacuation and takes much time, which makes impossible to collect many data points. It is therefore necessary to monitor the pressure in order to observe the trend. Furthermore, to monitor only the pressure is more convenient and helps reduce the evacuation time. However, a wide range gauge has poor precision and large individual difference. Furthermore, the relationship between the two parameters may depend on the condition of the chamber inner surface. For this reason, the relationship between the two parameters, that is, the data corresponding to FIG. 2, should be obtained in advance. A value a given by a=LR/P [L/s] is to be obtained, where LR [PaL/s] is the leak rate and P [Pa] is the pressure. Assuming that a baseline leak rate is $LR_B$ and a baseline pressure is $P_B$, the smaller (tighter) of $LR_B/a$ and $P_B$ is selected to be a target pressure $P_T$.

In general, in the process of evacuating a leakproof vacuum chamber in the high vacuum region, that is, of evacuating water adsorbed on the chamber inner surface, it is well known that the change of the chamber pressure P is relatively well represented by $$P = P_0 \cdot t^{-a} \quad (1)$$

The parameter a depends on the material of the chamber, the time period of exposure to the atmosphere and the like. For example, according to J. F. McAndrew et al. (J. Vac. Sci. Technol. A, 14, 1996, p. 1266), a=0.582 to 0.979 for a vacuum chamber having an inner surface made of anodized aluminum. Experiments conducted by the inventors revealed that a=0.9 to 1.2 for a vacuum chamber made of anodized aluminum and stainless steel. Generally, the parameter a can take a value in the range of 0.5 to 1.5.

Taking logarithm on both sides of equation (1) yields $$\log(P) = -a \cdot \log(t) + \log(P_0) \quad (2)$$

This draws a line with a slope of −a on the double logarithmic chart having the logarithm of t on the horizontal axis and the logarithm of P on the vertical axis.

On the other hand, if there are any leaks, then $$P = P_0 t^{-a} + P_L \quad (3)$$

On the double logarithmic chart, the pressure $P = P_L$ for $t \to \infty$. For $P_L > P_T$, the apparatus will not reach the target pressure.

Figure 3:
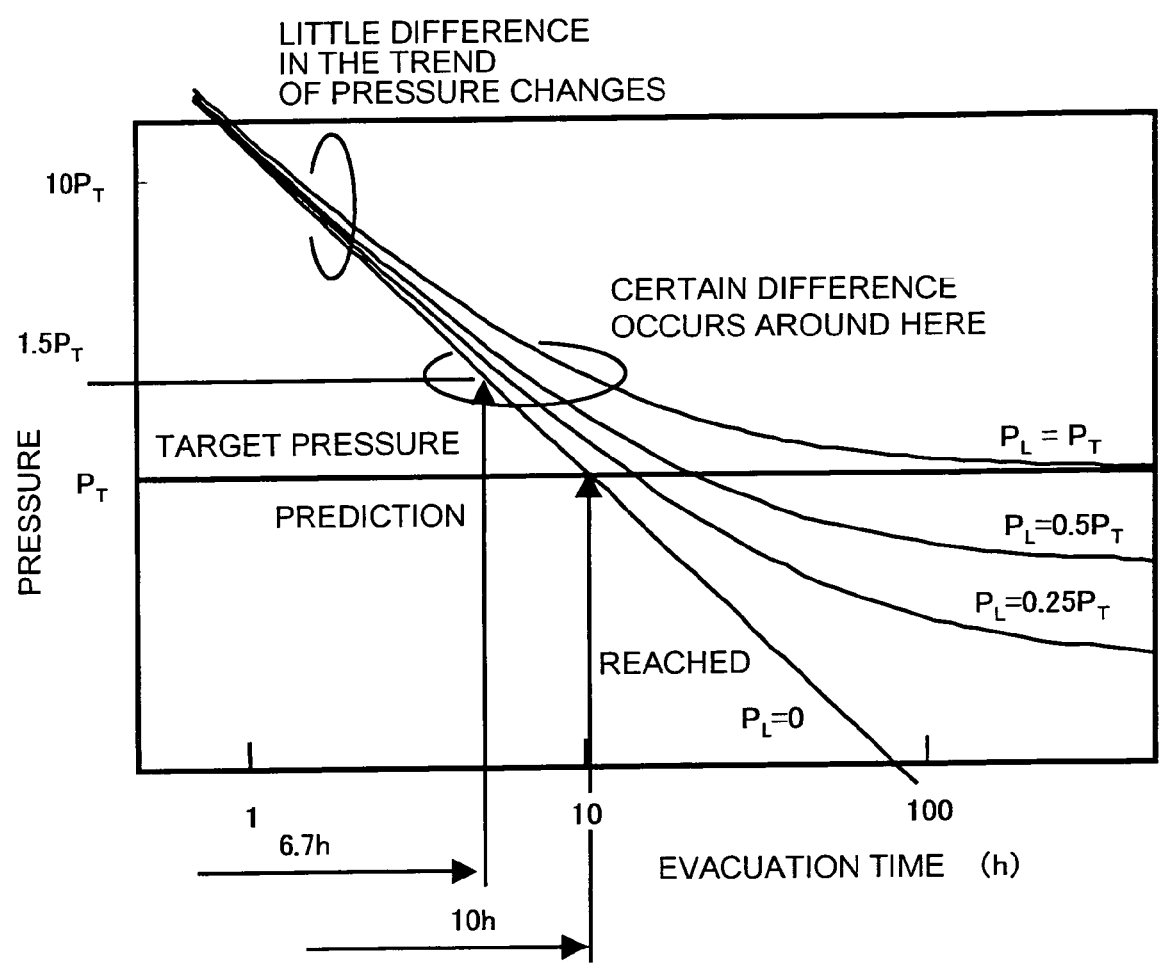
FIG. 3 shows a trend of pressure when there are leaks from the atmosphere.

FIG. 3 is a schematic diagram of pressure changes with or without leaks. It can be seen that for $P_L$ being relatively close to $P_T$, leakage of the chamber is difficult to determine in the region of relatively high pressures even if the target pressure may not be reached (of course, large leaks could be determined). If the value of a is known in advance, leakage could be determined from the pressure trend because the apparent value of a is likely to appear small. However, the value of a depends on the atmospheric exposure time and is not necessarily determined to be a unique value. Therefore, leakage is difficult to determine until the target pressure is approached, and the time to reach the target pressure cannot be predicted.

However, since the pressure reduces logarithmically with time, it takes significant time to actually reach the target pressure even after the pressure is considerably close to the target pressure on the double logarithmic chart. For example, if a=1 and it takes 10 hours to reach the target pressure $P_T$ from the beginning of evacuation, then it takes 6.7 hours to reach 1.5 $P_T$ from the atmosphere, and it further takes 3.3 hours to reach $P_T$ from 1.5 $P_T$. As clearly seen in FIG. 4, the time to reach the target pressure $P_T$ at 3.3 hours ahead can be predicted with considerable accuracy from the trend of pressure change from the beginning of evacuation to 1.5 $P_T$.

Figure 4:
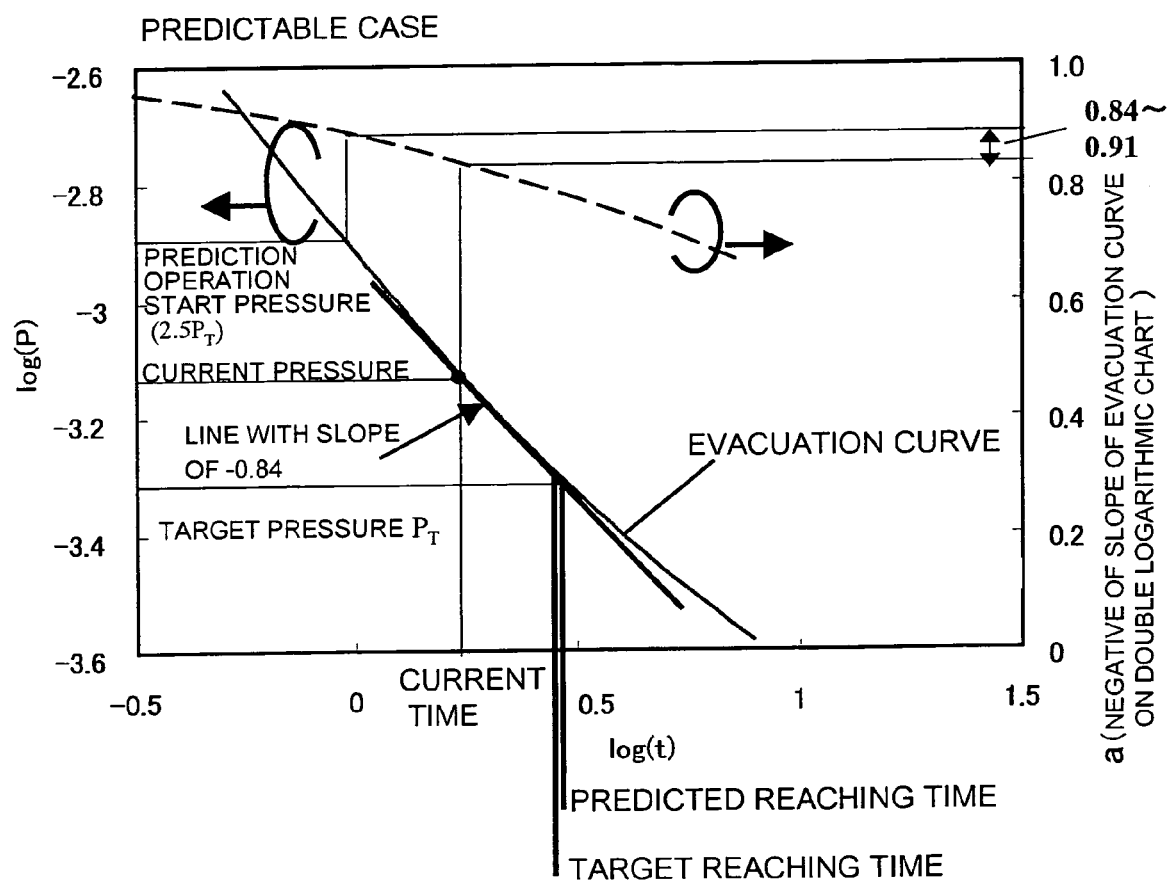
FIG. 4 illustrates a method of predicting the target pressure reaching time (when there are no leaks and the time is predictable).

FIG. 4 shows a method of predicting the time to reach the target pressure. In the figure, the horizontal axis is the logarithm of time, and the vertical axis is the logarithm of pressure. During evacuation, when the pressure reaches a value of, for example, 2.5 times the target pressure $P_T$, a process of predicting the target reaching time is activated. From the beginning of the prediction process, pressure decrease is monitored down to, for example, 1.5 $P_T$. The absolute value of its slope on the double logarithmic chart, that is, the change of the above-mentioned value a is monitored. When the change is within a prescribed range (i.e., when the value of a is stable), it is determined that the target reaching time is predictable. The minimum of a is then used to predict the target reaching time according to equation (1).

Figure 5:
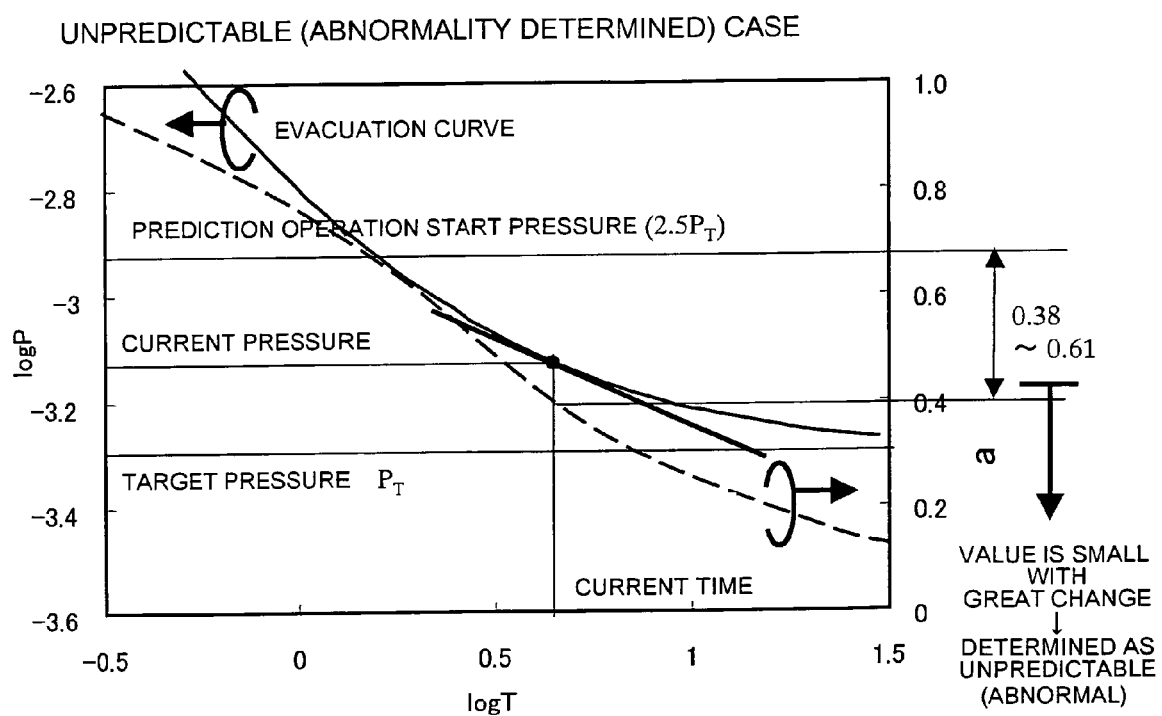
FIG. 5 illustrates a method of predicting the target pressure reaching time (when there are leaks and evacuation abnormality is detected).

FIG. 5 shows a case determined as abnormal due to leaks from the atmosphere. Since pressure decrease approaches saturation, the value of a is smaller than in FIG. 4, and more likely to gradually decrease during prediction. In this case, it is determined that the pressure is approaching saturation, and that evacuation abnormality (leakage) has occurred.

In the above-mentioned patent document by Fukuzawa et al. (Japanese Laid-Open Patent Application 2002-346367), the evacuation trend is compared to a theoretical formula for a cryopump to predict the target reaching time. However, various materials are used inside the chamber of actual semiconductor manufacturing apparatus such as etching apparatus. If the chamber interior is almost made of stainless steel, the pressure change is relatively close to the theoretical formula, and the values of a upon atmospheric exposure of the chamber have a small dispersion (a assumes values near 1). In this case, the time to reach the target pressure may be predictable from high pressures relatively far from the target pressure. However, in recently available apparatus, aluminum alloy covered with anodized aluminum coating is often used. In addition, polymer material such as Teflon® may be used, or the surface of the stainless steel material may be modified with corrosive process gas. These factors make it difficult to determine a theoretical evacuation curve (a may assume a value between 0.5 and 1.5). In contrast, the prediction method according to the invention as shown in FIGS. 4 and 5 is applicable to any situations and apparatus, although the prediction is made from pressures relatively close to the target pressure.

Figure 6:
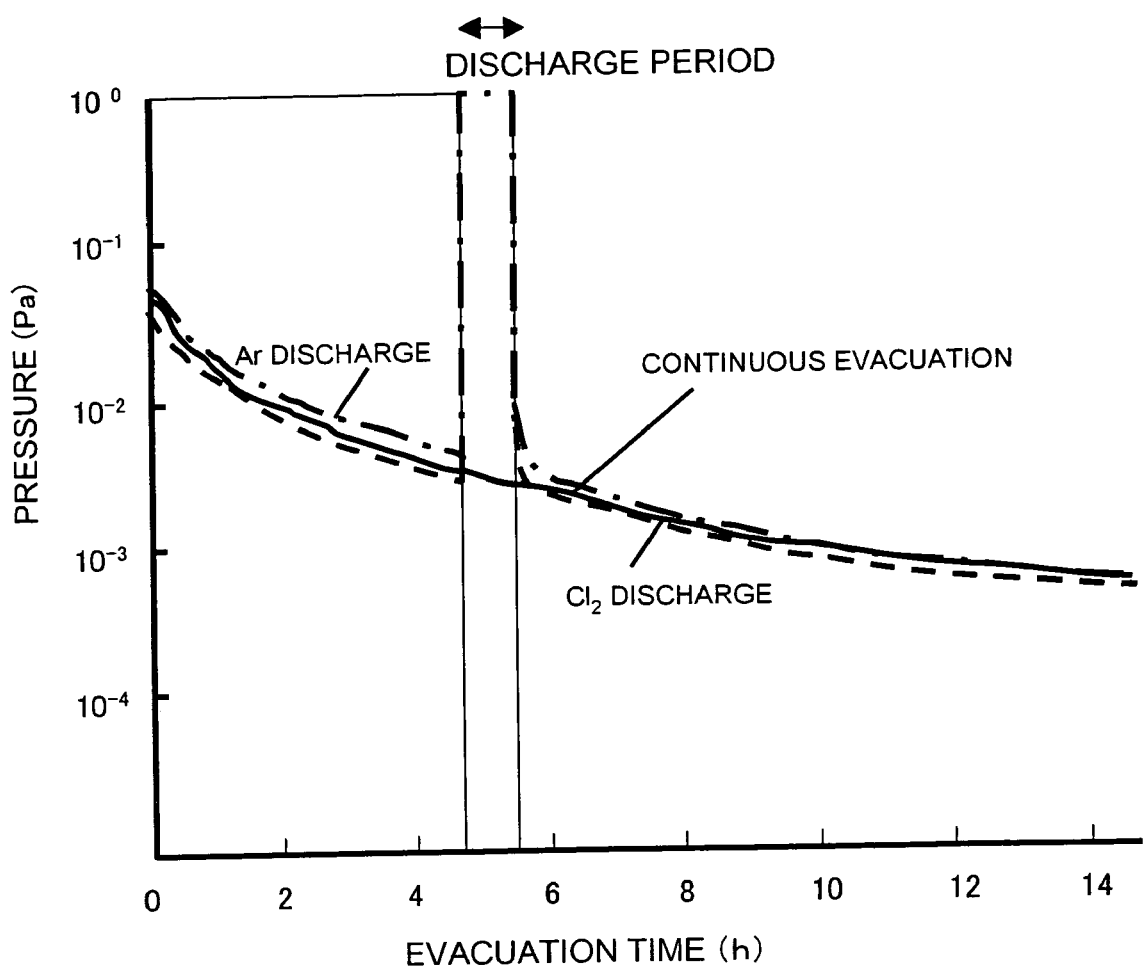
FIG. 6 shows how discharge in various gases during evacuation affects the evacuation trend.

An object of the invention is to reduce the apparatus startup time after wet cleaning including break-in discharge and aging, as well as to detect evacuation abnormality. For this reason, it is necessary to examine the effect of discharge on evacuation. FIG. 6 shows pressure changes interrupted by discharge in Ar or chlorine during evacuation. In FIG. 6, "Ar DISCHARGE" denotes the evacuation curve with insertion of Ar discharge, "$Cl_2$ DISCHARGE" denotes the evacuation curve with insertion of $Cl_2$ discharge, and "CONTINUOUS EVACUATION" denotes the evacuation curve for continuous evacuation. In FIG. 6, during discharge, since the pressure is adjusted to be constant (1 Pa in the figure) by introducing process gas, the pressure is increased. However, it can be seen from the figure that insertion of discharge during evacuation does not affect the subsequent decrease of pressure. In other words, it is contemplated that discharging under the condition of introducing inert gas or process gas is equivalent to simply evacuating during that time period. While it is generally said that discharge has an effect of removing water molecules adsorbed on the surface, discharge does not actually affect vacuum evacuation for a vacuum chamber of semiconductor manufacturing apparatus. One reason for this is that there are many places in the vacuum chamber that are out of reach of discharge. Another reason is that most of the water molecules are diffused from the inside of anodized aluminum coating, which is highly porous (this is also indicated in the above-referenced paper by J. F. McAndrew et al.). Therefore, when the time to reach the target degree of vacuum can be predicted in advance according to the method described with reference to FIGS. 4 and 5, break-in discharge and/or aging may be inserted before the target degree of vacuum is reached. Aging may be carried out so that the target degree of vacuum may be just reached at the time of completion of the aging. Alternatively, at the time of completion of the aging, the degree of vacuum may fall below the target, allowing for some margin. In this way, the target degree of vacuum can be reached as predicted even if discharge is inserted during evacuation. The startup time of the apparatus can thus be reduced by just or nearly the amount of time required for break-in discharge and aging.

Figure 7:
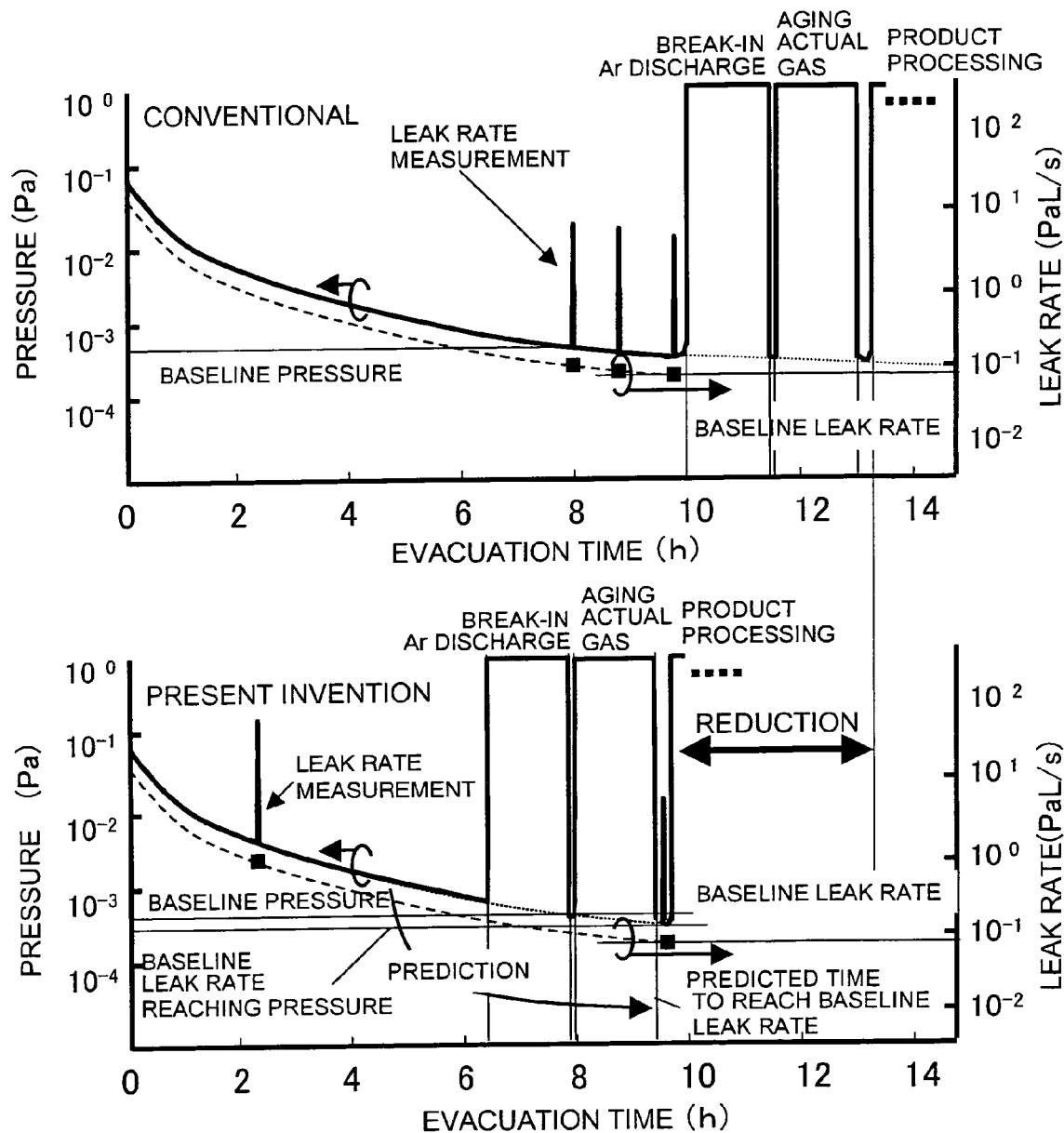
FIG. 7 shows how the startup time after wet cleaning of the apparatus is reduced by carrying out the invention.

According to the invention, as shown in FIG. 7, leakage (evacuation abnormality) of the chamber and the target reaching time can be predicted. Furthermore, the downtime of the apparatus due to wet cleaning can be reduced by carrying out break-in discharge and aging in advance before a prescribed target degree of vacuum is reached. FIG. 7 shows a process of evacuation for etching apparatus, given a baseline pressure and leak rate. In conventional methods, the pressure of the chamber is monitored, and when the chamber pressure falls below the baseline pressure, the leak rate is measured several times. When any of the leak rate measurements falls below the baseline leak rate, a predefined operation of break-in discharge and/or aging is carried out for a predetermined time period, and then actual product processing is started. On the other hand, according to the invention, the leak rate is first measured in a relatively early phase of evacuation. Assuming that the decrease of pressure is equivalent to the decrease of leak rate, the pressure to reach the baseline leak rate is determined. Next, the time to reach the pressure is predicted from the trend of the subsequent pressure decrease. Break-in discharge and aging are scheduled to terminate at that time, and carried out. Upon termination of break-in discharge and aging, the leak rate is measured to confirm that the baseline leak rate is reached, and then product processing is started. In this way, the downtime of the apparatus can be reduced by nearly the amount of time for break-in discharge and aging.

Figure 8:
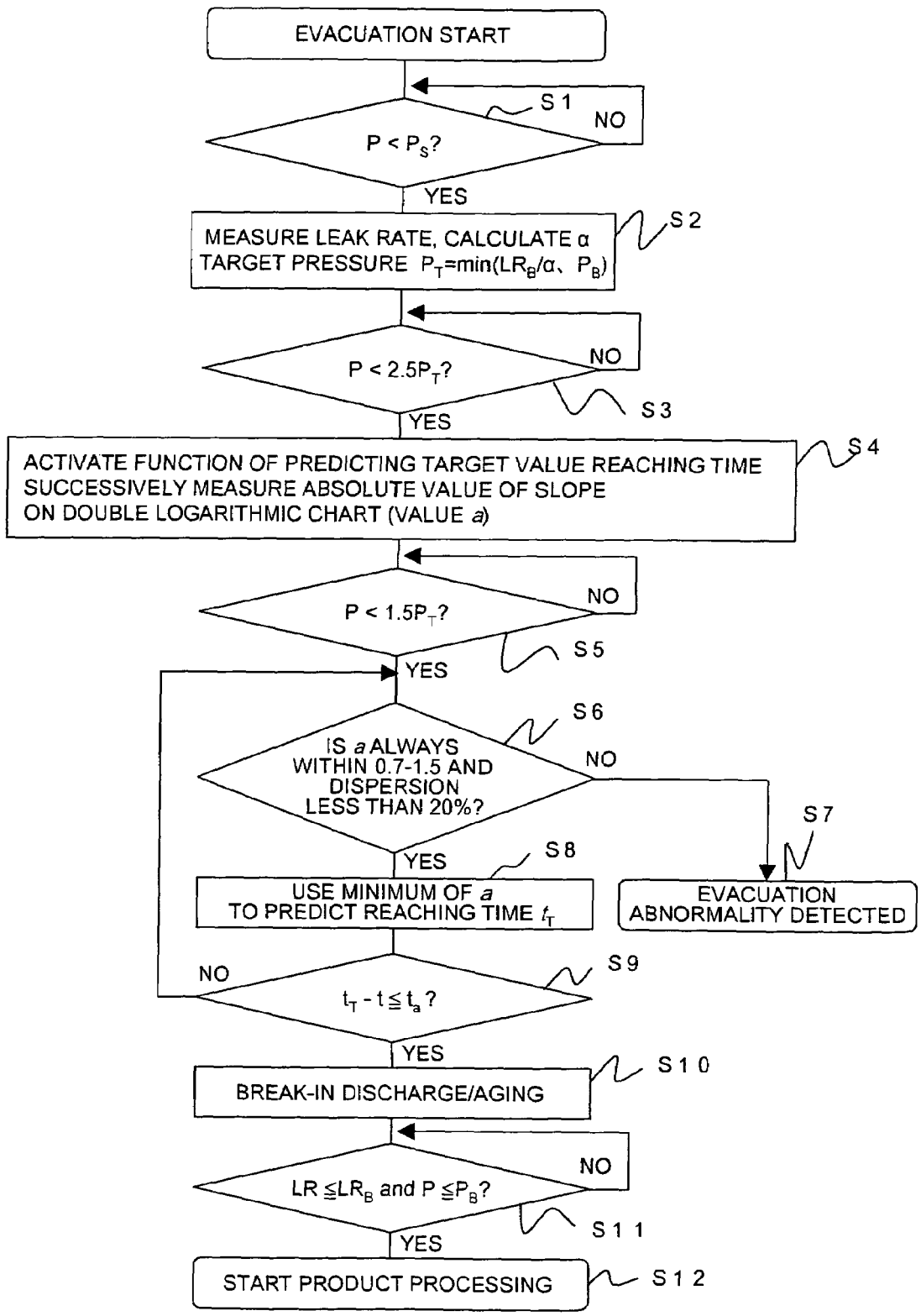
FIGS. 8 to 10 are flow charts of a system sequence showing an embodiment of the invention.

To describe the invention more specifically, FIG. 8 shows a specific flow chart as an embodiment of the invention. After evacuation is started, the pressure in the chamber is monitored (S1). When the pressure falls below a predetermined pressure value $P_S$, the leak rate is measured first. The measured leak rate LR and the pressure P at that time are used to determine a=LR/P. At the same time, the output value of the absolute pressure gauge can be used to calibrate the wide range gauge (although limited to within the measurement range of the absolute pressure gauge). The smaller of $LR_B$/a and $P_B$ is determined to be a target pressure $P_T$ (S2). Next, the pressure is monitored to determine whether it falls below, for example, 2.5 times the target pressure $P_T$ (S3). If so, a function of predicting the time to reach the target pressure is activated. Subsequently, on a constant basis, the value of a is successively calculated (S4), which corresponds to the negative (i.e., absolute value) of the slope of the trend of temporal change of the pressure on the double logarithmic chart. The pressure is monitored to determine whether it falls below, for example, 1.5 times the target (S5). If so, it is checked to what extent the value of a has changed (S6). When the value of a is constant, there is no leak from the atmosphere, indicating a nearly ideal evacuation property for water molecules. When the value of a is within a predefined range and dispersion, for example, within the range of 0.7 to 1.5 and dispersion less than 20%, it is determined that evacuation is satisfactory (Yes). On the other hand, when it departs from this range or dispersion (No), it is determined that leakage occurs and evacuation is abnormal (S7). When it is determined that evacuation is satisfactory (Yes), the minimum value of a is used to predict the time to reach the target assuming that the pressure decreases in proportion to $t^{-a}$ as shown in equation (1) (S8). Next, the time from the current time to the target reaching time, $t_T$–t, is compared to the time required for break-in discharge and aging, $t_a$ (S9). If $t_T$–t is greater (No), evacuation is continued. In this case, the target reaching time is constantly updated since prediction is continued. If $t_T$–t is less than or equal to $t_a$ (Yes), break-in discharge and/or aging is carried out (S10). If the pressure changes as predicted, it will reach the target when aging is terminated. Finally, the pressure and leak rate are monitored to confirm whether they are at the prescribed values (RL=$LR_B$ and P=$P_B$?) (S11), and then the flow is passed to actual product processing (S12).

Figure 9:
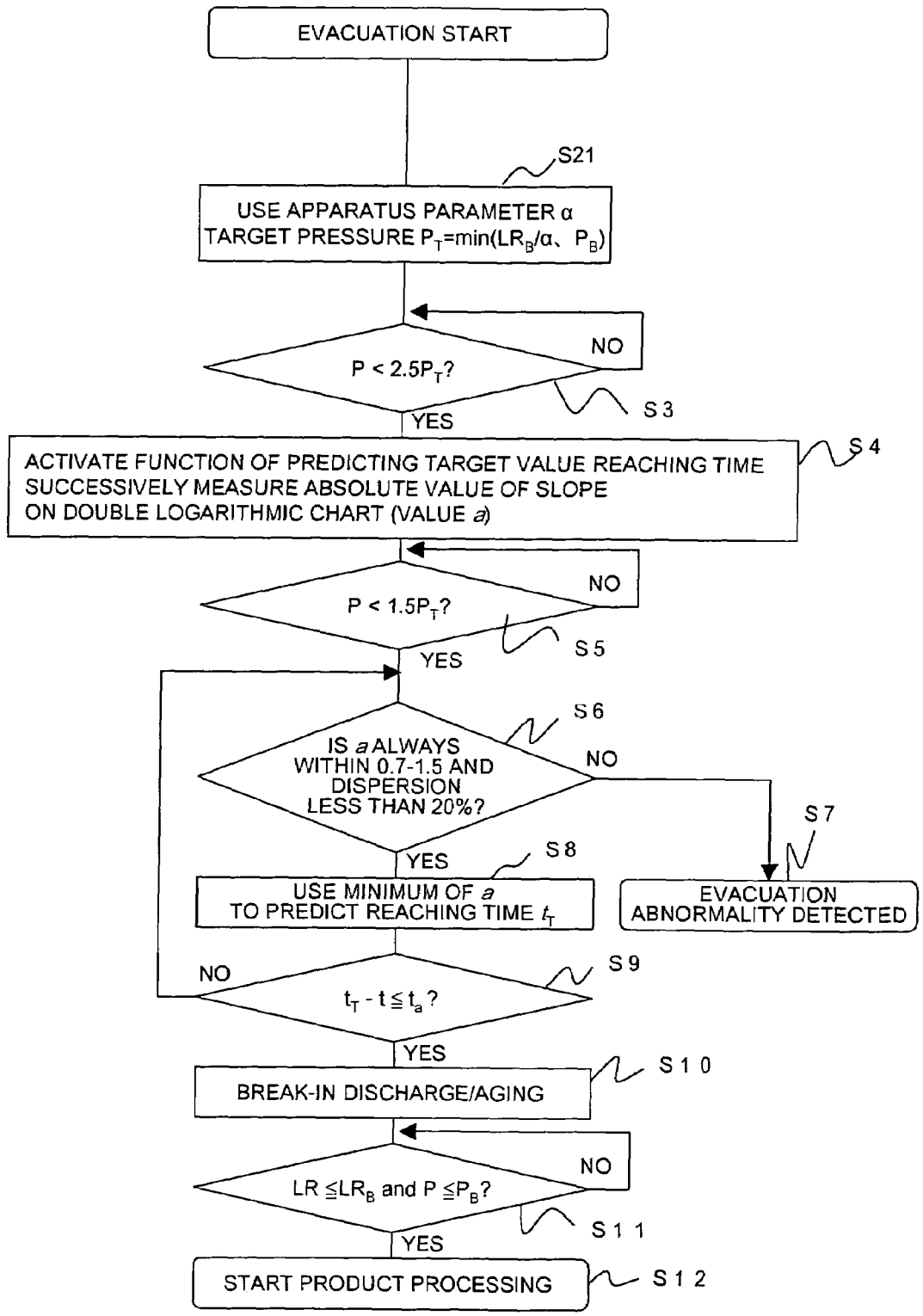

FIG. 9 shows a case where a is maintained in advance as an apparatus parameter. In this case, it is not necessary to measure the leak rate and calculate a each time as shown at steps S1 and S2 in FIG. 8. However, the value of a can be varied due to replacement of the wide range gauge or changing condition of the chamber inner surface. For this reason, the value of a must be periodically measured. In addition, it must be measured when any gauge, pump, or other component is replaced. The process following step S3 is carried out in the same manner as in FIG. 8.

Figure 10:
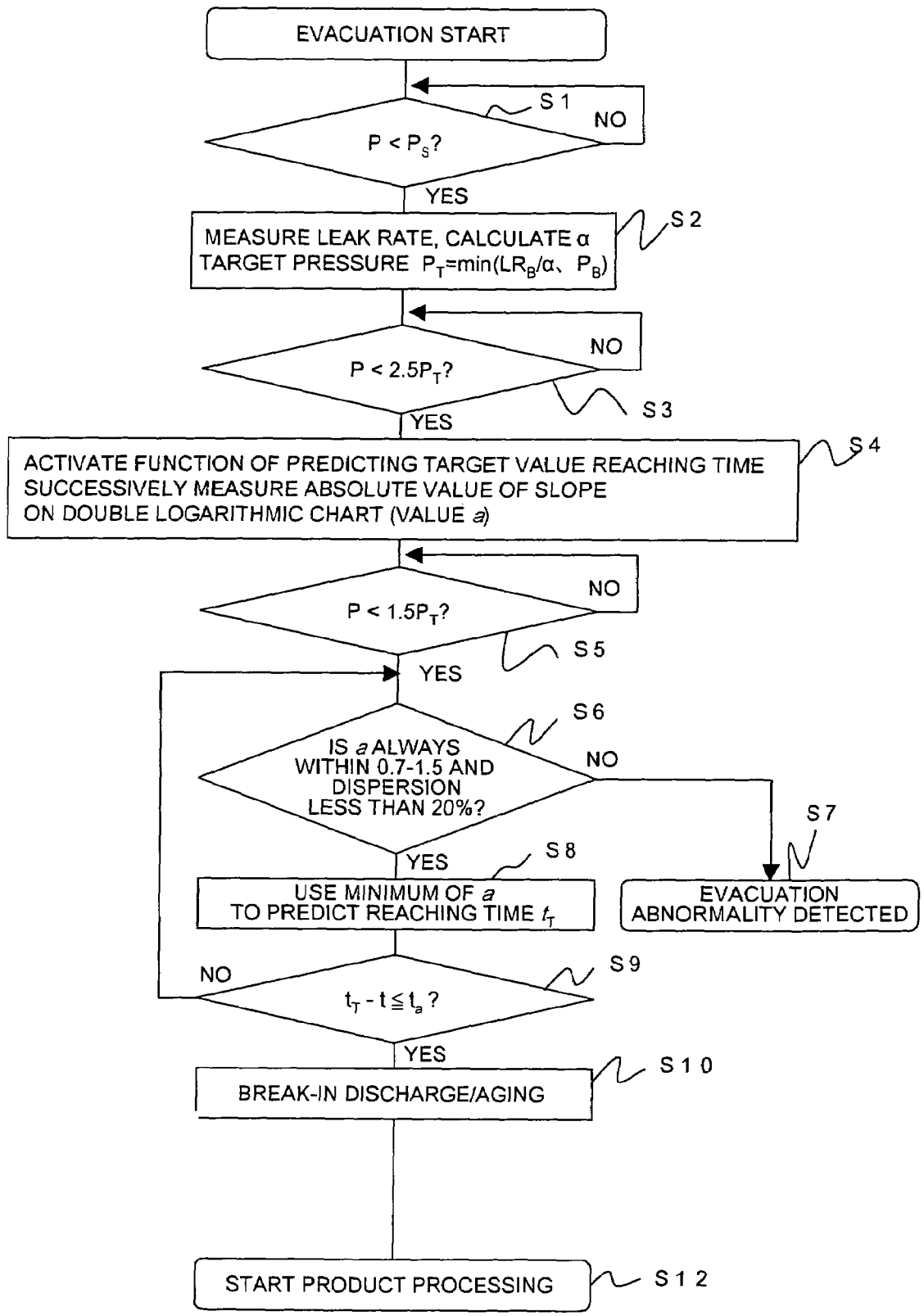

FIG. 10 shows a case where the measurement of finally reached pressure and leak rate at step S11 in FIG. 8 is omitted. The rest of the process (S1 to S10, S12) is carried out in the same manner as in FIG. 8. According to the invention, the trend of pressure change during evacuation is used to confirm that the apparatus has no leaks and that the pressure will decrease sufficiently in a certain time period. Therefore, essentially, it is not necessary to particularly establish and check a target value of pressure and/or leak rate. Conventionally, reaching the target degree of vacuum is used as a criterion to determine whether vacuum evacuation of the apparatus is satisfactory for processing products. The invention may be viewed as replacing this criterion with the trend of pressure change during vacuum evacuation.

What is claimed is:

1. A vacuum processing apparatus that requires at least one of break-in discharge and aging for a vacuum processing chamber after at least one of wet cleaning, component replacement of the vacuum chamber and vacuum evacuation of the vacuum processing chamber, and before processing of a workpiece to be processed in the vacuum processing chamber, the apparatus comprising:
  a high precision absolute pressure gauge which measures pressure in the vacuum processing chamber during evacuation thereof;
  a wide range gauge capable of measuring a wide range of pressures which measures pressure in the vacuum processing chamber during evacuation thereof;
  analysis means for performing analysis by comparing a prescribed value of a pressure trend predetermined by using a pressure trend measured by the high precision absolute pressure gauge and the wide range gauge during vacuum evacuation of the vacuum processing chamber and for determining whether the vacuum evacuation is satisfactory; and
  a controller which controls starting of at least one of the break-in discharge and aging for the vacuum processing chamber upon a determination by the analysis means that the vacuum evacuation is satisfactory even when an actual pressure which is measured is not below the prescribed value so as to enable reduction of time for initiating processing of the workpiece to be processed after the at least one of wet cleaning, component replacement of the vacuum processing chamber and vacuum evacuation of the vacuum processing chamber.

2. A vacuum processing apparatus according to claim 1, wherein the analysis means determines a relationship between an apparent gas inflow rate measured by the high precision absolute pressure gauge when the vacuum processing chamber is vacuum sealed and a vacuum processing chamber pressure is measured by the wide range gauge, and then measures only the pressure to determine whether a baseline of the apparent gas inflow rate is reached.

3. A vacuum processing apparatus according to claim 1, wherein the controller starts both of the break-in discharge and the aging for the vacuum processing chamber in accordance with the determination by the analysis means.

4. A vacuum processing apparatus that requires at least one of break-in discharge and aging for a vacuum processing chamber after at least one of wet cleaning component replacement of the vacuum processing chamber and vacuum evacuation of the vacuum processing chamber and before processing of a workpiece to be processed in the vacuum processing chamber, the apparatus comprising:
  a high precision absolute pressure gauge which measures pressure in the vacuum processing chamber during evacuation thereof;
  a wide range gauge capable of measuring a wide range of pressures which measures pressure in the vacuum processing chamber during evacuation thereof;
  analysis means for determining whether the vacuum evacuation is satisfactory by using a pressure trend during vacuum evacuation and for predicting a time to reach a prescribed degree of vacuum; and
  a controller which controls of at least one of the starting of the break-in discharge and aging so that the at least one of the break-in discharge and the aging is terminated near the time predicted by the analysis means so as to enable reduction of time for initiating processing of the workpiece to be processed after the at least one of wet cleaning, component replacement of the vacuum processing chamber and vacuum evacuation of the vacuum processing chamber.

5. A vacuum processing apparatus according to claim 4, wherein the analysis means determines a relationship between an apparent gas inflow rate measured by the high precision absolute pressure gauge when the vacuum processing chamber is vacuum sealed, and a vacuum processing chamber pressure is measured by the wide range gauge, and then measures only the pressure to determine whether a baseline of the apparent gas inflow rate is reached.

6. A vacuum processing apparatus according to claim 5, wherein the controller starts both of the break-in discharge and the aging for the vacuum processing chamber in accordance with the time predicted by the analysis means.

7. A vacuum processing apparatus according to any one of claims 1 to 6, wherein at least one of the vacuum processing chamber and at least one internal component of the vacuum processing chamber has a surface of anodized aluminum coating.

8. A vacuum processing method for a vacuum processing apparatus that requires at least one of break-in discharge and aging for a vacuum processing chamber after at least one of wet cleaning, component replacement of the vacuum processing chamber and vacuum evacuation of the vacuum processing chamber, and before processing of a workpiece to be processed in the vacuum processing chamber, the method comprising the steps of:

analyzing by comparing a prescribed value of a pressure trend predetermined by using a pressure trend measured by a high precision absolute pressure gauge and a wide range gauge which measure pressure in the vacuum processing chamber during vacuum evacuation of the vacuum processing chamber and determining whether the vacuum evacuation is satisfactory; and controlling starting of at least one of the break-in discharge and aging for the vacuum processing chamber upon determining in the analyzing step that the vacuum evacuation is satisfactory even when an actual pressure measured is not below the prescribed value so as to enable reduction of time for initiating processing of the workpiece to be processed after the at least one of wet cleaning, component replacement of the vacuum processing chamber and vacuum evacuation of the vacuum processing chamber.

9. A vacuum processing method according to claim 8, further comprising the step of determining a relationship between an apparent gas inflow rate measured by the absolute pressure gauge when the vacuum processing chamber is vacuum sealed and a vacuum processing chamber pressure is measured by the wide range gauge, and then measuring only the pressure to determine whether a baseline of the gas inflow rate is reached.

10. A vacuum processing method according to claim 8, wherein when determining that the vacuum evacuation is satisfactory, predicting a time to reach a prescribed degree of vacuum, and starting the at least one of the break-in discharge and aging so that the at least one of the break-in discharge and the aging is terminated near the predicted time.

11. A vacuum processing apparatus according to claim 8, wherein the controlling step includes controlling starting of both of the break-in discharge and the aging for the vacuum processing chamber.

* * * * *